US012340932B2

(12) United States Patent
Jung et al.

(10) Patent No.: US 12,340,932 B2
(45) Date of Patent: Jun. 24, 2025

(54) COIL COMPONENT

(71) Applicant: SAMSUNG ELECTRO-MECHANICS CO., LTD., Suwon-si (KR)

(72) Inventors: Jung Hyuk Jung, Suwon-si (KR); Sung Hee Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 965 days.

(21) Appl. No.: 17/159,728

(22) Filed: Jan. 27, 2021

(65) Prior Publication Data

US 2022/0172877 A1 Jun. 2, 2022

(30) Foreign Application Priority Data

Nov. 27, 2020 (KR) ........................ 10-2020-0162227

(51) Int. Cl.
*H01F 27/28* (2006.01)
*H01F 27/24* (2006.01)
(Continued)

(52) U.S. Cl.
CPC ......... *H01F 27/2804* (2013.01); *H01F 27/24* (2013.01); *H01F 27/29* (2013.01); *H01F 27/323* (2013.01); *H01F 2027/2809* (2013.01)

(58) Field of Classification Search
CPC ......... H01F 27/2804; H01F 2027/2809; H01F 17/0013; H01F 17/0006; H01F 5/003;
(Continued)

(56) References Cited

U.S. PATENT DOCUMENTS

2014/0125194 A1* 5/2014 Lee ........................ H01G 4/012 336/200
2014/0292466 A1* 10/2014 Watanabe ............... H01F 27/29 205/118
(Continued)

FOREIGN PATENT DOCUMENTS

JP 07192972 A * 7/1995
JP 11354324 A * 12/1999
(Continued)

OTHER PUBLICATIONS

Korean Office Action dated Mar. 22, 2025 issued in Korean Patent Application No. 10-2020-0162227 (with English translation).

*Primary Examiner* — Tszfung J Chan
(74) *Attorney, Agent, or Firm* — MORGAN, LEWIS & BOCKIUS LLP

(57) ABSTRACT

A coil component includes: a support substrate; first and second coil portions disposed on the support substrate to be spaced apart from each other; a body surrounding the support substrate and the first and second coil portions; and a plurality of external electrodes disposed on a surface of the body, wherein each of the first and second coil portions includes a coil pattern and a lead pattern connected to the coil pattern and exposed from the surface of the body, and a width of an exposed portion of the lead pattern exposed from the surface of the body is greater than a width of each of the coil pattern and the plurality of external electrodes.

17 Claims, 8 Drawing Sheets

(51) Int. Cl.
*H01F 27/29* (2006.01)
*H01F 27/32* (2006.01)

(58) Field of Classification Search
CPC ........ H01F 27/29; H01F 27/292; H01F 27/24; H01F 27/02; H01F 27/022
USPC .................................................. 336/200, 232
See application file for complete search history.

(56) References Cited

U.S. PATENT DOCUMENTS

| | | | | |
|---|---|---|---|---|
| 2016/0078986 | A1* | 3/2016 | Yoon | H01F 5/04 336/83 |
| 2018/0061670 | A1* | 3/2018 | Ishida | H01L 23/50 |
| 2018/0075965 | A1* | 3/2018 | Yoshioka | H01F 27/2823 |
| 2018/0277296 | A1* | 9/2018 | Endo | H01F 41/046 |
| 2019/0259527 | A1 | 8/2019 | Yoon et al. | |
| 2020/0052673 | A1* | 2/2020 | Sasaki | H03H 7/09 |
| 2020/0098506 | A1* | 3/2020 | Hamada | H01F 27/32 |

FOREIGN PATENT DOCUMENTS

| | | | | | |
|---|---|---|---|---|---|
| JP | 2007059539 | A | * | 3/2007 | |
| KR | 2018058634 | A | * | 6/2018 | H01B 1/22 |
| KR | 10-2019-0101102 | A | | 8/2019 | |
| KR | 10-2047563 | B1 | | 11/2019 | |

* cited by examiner

COIL COMPONENT

CROSS-REFERENCE TO RELATED APPLICATION(S)

This application claims the benefit of priority to Korean Patent Application No. 10-2020-0162227, filed on Nov. 27, 2020 in the Korean Intellectual Property Office, the disclosure of which is incorporated herein by reference in its entirety.

TECHNICAL FIELD

The present disclosure relates to a coil component.

BACKGROUND

An inductor, a coil component, is a representative passive electronic component used in an electronic device together with a resistor and a capacitor.

Meanwhile, demand for an array-type coil component, among coil components, has increased so as to reduce a mounting area.

The array-type coil component may have a non-coupled or coupled inductor form or a mixed form of a non-coupled inductor form and a coupled inductor form depending on a coupling coefficient or a mutual inductance between a plurality of coil portions.

In many applications, a coupled inductor that is not a non-coupled inductor, that is, that has a coupling coefficient of about 0.1 to 0.9 and has a certain level of leakage inductance has been required, and a coupling coefficient needs to be controlled for each application.

However, due to structural characteristics of the coupled inductor including two electrodes disposed on one surface thereof, a defect that an insulating layer hides the electrodes may occur.

SUMMARY

An aspect of the present disclosure may provide an array-type coil component in which a defect occurring due to an insulating layer obscuring two electrodes disposed on one surface of the coil component may be reduced.

According to an aspect of the present disclosure, a coil component may include: a support substrate; first and second coil portions disposed on the support substrate to be spaced apart from each other; a body surrounding the support substrate and the first and second coil portions; and a plurality of external electrodes disposed on a surface of the body, wherein each of the first and second coil portions includes a coil pattern and a lead pattern connected to the coil pattern and exposed from the surface of the body, and a width of an exposed portion of the lead pattern exposed from the surface of the body is greater than a width of each of the coil pattern and the plurality of external electrodes.

According to another aspect of the present disclosure, a coil component may include: a support substrate; first and second coil portions disposed on at least one surface of the support substrate to be spaced apart from each other; a body surrounding the support substrate and the first and second coil portions; and first to fourth external electrodes disposed on the body to be spaced apart from each other, wherein the first coil portion includes a first coil pattern and a first upper lead pattern and a first lower lead pattern connected to the first coil pattern and exposed from the body, the second coil portion includes a second coil pattern and a second upper lead pattern and a second lower lead pattern connected to the second coil pattern and exposed from the body, at least portions of each of the first upper lead pattern and the second lower lead pattern overlap each other when projected in a direction perpendicular to the at least one surface of the support substrate, and at least portions of each of the second upper lead pattern and the first lower lead pattern overlap each other when projected in the direction perpendicular to the at least one surface of the support substrate.

According to still another aspect of the present disclosure, a coil component may include: a support substrate; first and second coil portions disposed on one surface of the support substrate to be spaced apart from each other; a body surrounding the support substrate and the first and second coil portions; and first and second external electrodes disposed on a first end surface of the body, spaced apart from each other, and connected to the first and second coil portions, respectively. Each of the first and second coil portions includes a coil pattern and a lead pattern connected to the coil pattern and exposed from the first end surface of the body, a width of an exposed portion of the lead pattern exposed from the first end surface of the body is greater than a width of an inner portion of the lead pattern connected to the coil pattern, and each exposed portion of the first and second coil portions at least partially overlaps a space between the first and second external electrodes, in a direction perpendicular to the first end surface.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
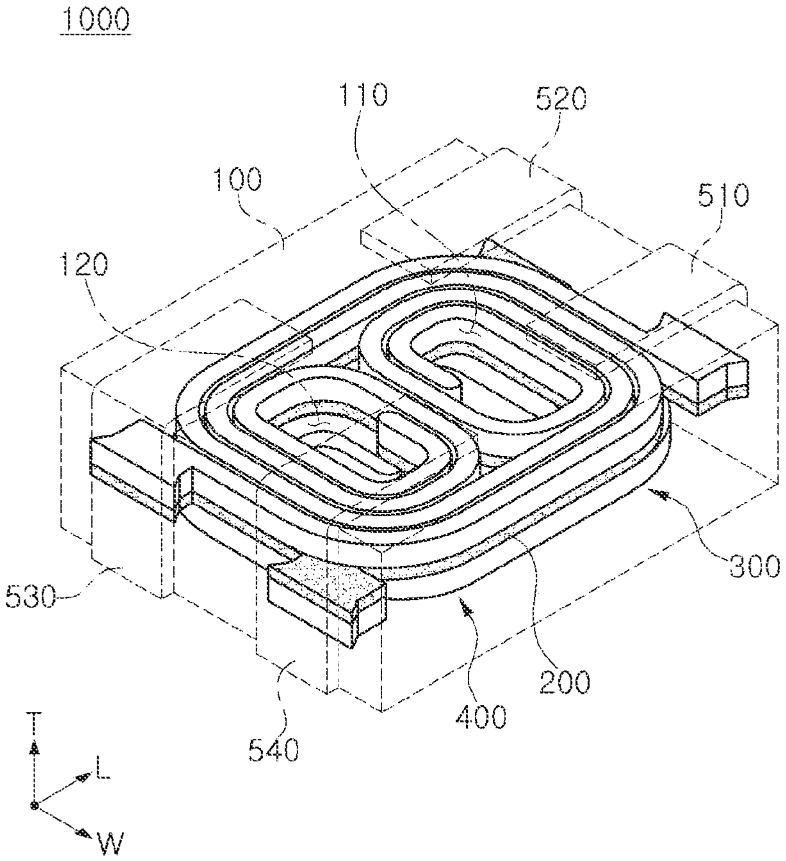
FIG. 1 is a schematic view illustrating a coil component according to an exemplary embodiment in the present disclosure.

Hereinafter, exemplary embodiments of the present disclosure will now be described in detail with reference to the accompanying drawings.

Further, a term "couple" not only refers to a case where respective components are in physically direct contact with each other, but also refers to a case where the respective components are in contact with another component with another component interposed therebetween, in a contact relationship between the respective components.

Since sizes and thicknesses of the respective components illustrated in the drawings are arbitrarily illustrated for convenience of explanation, the present disclosure is not necessarily limited to those illustrated in the drawings.

In the drawings, an L direction refers to a first direction or a length direction, a W direction refers to a second direction or a width direction, and a T direction refers to a third direction or a thickness direction.

Hereinafter, coil components according to exemplary embodiments in the present disclosure will be described in detail with reference to the accompanying drawings. In describing exemplary embodiments in the present disclosure with reference to the accompanying drawings, components that are the same as or correspond to each other will be denoted by the same reference numerals, and an overlapping description therefor will be omitted.

Various kinds of electronic components may be used in an electronic device, and various kinds of coil components may be appropriately used between these electronic components depending on their purposes in order to remove noise, or the like.

That is, the coil components used in the electronic device may be a power inductor, high frequency (HF) inductors, a general bead, a bead for a high frequency (GHz), a common mode filter, and the like.

Figure 2:
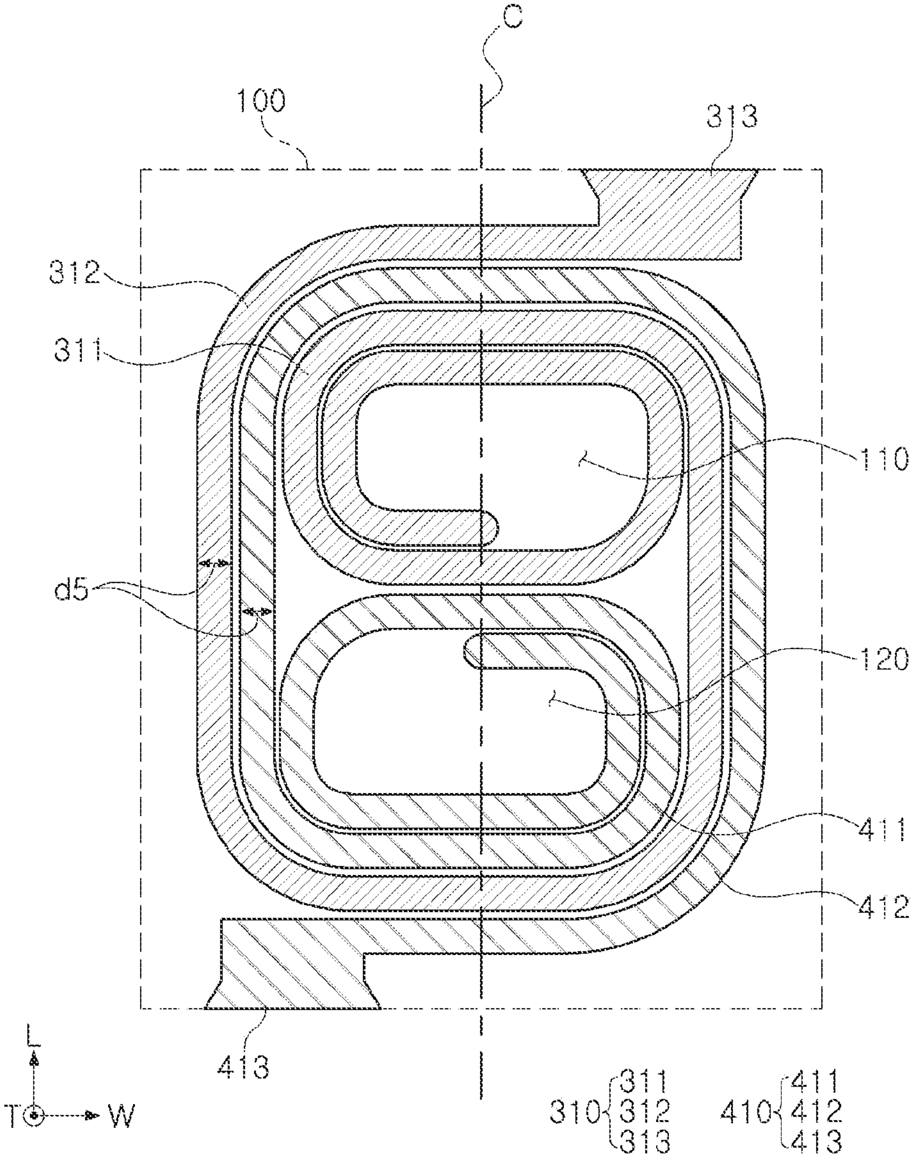
FIG. 2 is a view illustrating a dispositional form of first and second coil portions on one surface of a support substrate when viewed from above in FIG. 1.
Figure 3:
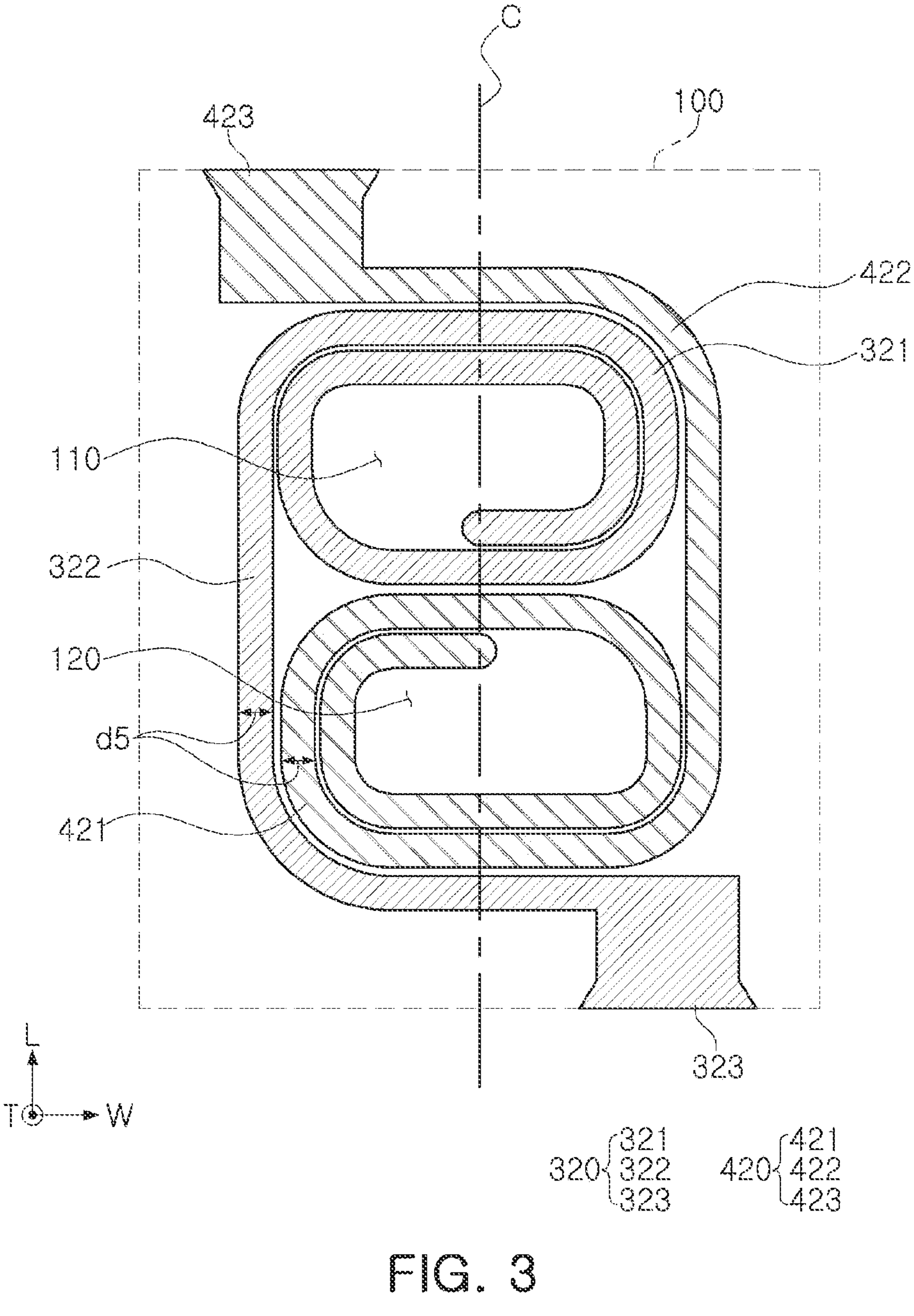
FIG. 3 is a view illustrating a dispositional form of the first and second coil portions on the other surface of the support substrate when viewed from above in FIG. 1.
Figure 4:
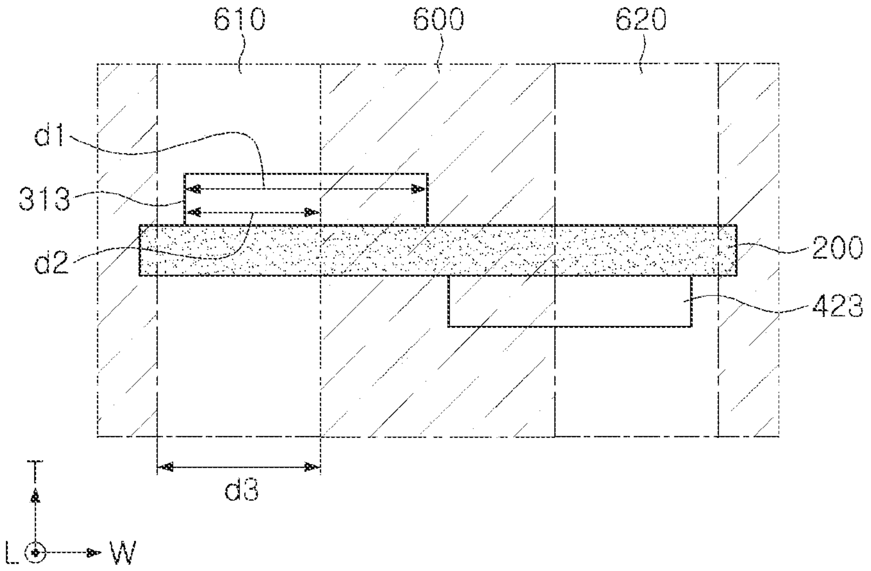
FIG. 4 is a view illustrating a disposition of lead patterns on a first end surface of a body when viewed in a length direction.

FIG. 1 is a schematic view illustrating a coil component 1000 according to an exemplary embodiment in the present disclosure. FIG. 2 is a view illustrating a dispositional form of first and second coil portions on one surface of a support substrate when viewed from above in FIG. 1. FIG. 3 is a view illustrating a dispositional form of the first and second coil portions on the other surface of the support substrate when viewed from above in FIG. 1. FIG. 4 is a view illustrating a disposition of lead patterns on a first end surface of a body when viewed in a length direction.

Referring to FIGS. 1 through 4, the coil component 1000 according to the exemplary embodiment in the present disclosure may include a body 100, a support substrate 200, a first coil portion 300, a second coil portion 400, and external electrodes 510, 520, 530, and 540, and may further include an insulating layer 600 (see FIG. 4) surrounding the body 100.

The body 100 may form an entire appearance of the coil component 1000 according to the present exemplary embodiment, and may have the support substrate 200, the first coil portion 300, and the second coil portion 400 buried therein.

The body 100 may generally have a hexahedral shape.

In FIG. 1, the body 100 may have a first surface and a second surface opposing each other in the length direction L, a third surface and a fourth surface opposing each other in the width direction W, and a fifth surface and a sixth surface opposing each other in the thickness direction T. The first to fourth surfaces of the body 100 may correspond to walls of the body 100 connecting the fifth and sixth surfaces of the body 100 to each other. Hereinafter, first and second end surfaces of the body 100 may refer to the first surface and the second surface of the body 100, first and second side surfaces of the body 100 may refer to the third surface and the fourth surface of the body 100, a first surface of the body 100 may refer to the sixth surface of the body, and a second surface of the body 100 may refer to the fifth surface of the body 100. Further, hereinafter, upper and lower surfaces of the body 100 may refer to the fifth and sixth surfaces of the body 100 determined on the basis of directions of FIG. 1, respectively.

The body 100 may include magnetic materials and a resin. Specifically, the body 100 may be formed by stacking one or more magnetic composite sheets including a resin and magnetic materials dispersed in the resin. However, the body 100 may also have a structure other than a structure in which the magnetic materials are dispersed in the resin. For example, the body 100 may be formed of a magnetic material such as ferrite.

The magnetic material may be ferrite or metal magnetic powder particles.

The ferrite powder particles may be, for example, one or more of spinel type ferrites such as Mg—Zn-based ferrite, Mn—Zn-based ferrite, Mn—Mg-based ferrite, Cu—Zn-based ferrite, Mg—Mn—Sr-based ferrite, or Ni—Zn-based ferrite, hexagonal ferrites such as Ba—Zn-based ferrite, Ba—Mg-based ferrite, Ba—Ni-based ferrite, Ba—Co-based ferrite, or Ba—Ni—Co-based ferrite, garnet type ferrite such as Y-based ferrite, and Li-based ferrite.

The metal magnetic powder particles may include one or more selected from the group consisting of iron (Fe), silicon (Si), chromium (Cr), cobalt (Co), molybdenum (Mo), aluminum (Al), niobium (Nb), copper (Cu), and nickel (Ni). For example, the metal magnetic powder particles may be one or more of pure iron powder particles, Fe—Si-based alloy powder particles, Fe—Si—Al-based alloy powder particles, Fe—Ni-based alloy powder particles, Fe—Ni—Mo-based alloy powder particles, Fe—Ni—Mo—Cu-based alloy powder particles, Fe—Co-based alloy powder particles, Fe—Ni—Co-based alloy powder particles, Fe—Cr-based alloy powder particles, Fe—Cr—Si-based alloy powder particles, Fe—Si—Cu—Nb-based alloy powder particles, Fe—Ni—Cr-based alloy powder particles, and Fe—Cr—Al-based alloy powder particles.

The metal magnetic powder particles may be amorphous or crystalline. For example, the metal magnetic powder particles may be Fe—Si—B—Cr based amorphous alloy powder particles, but are not necessarily limited thereto.

The ferrite and the metal magnetic powder particles may have average diameters of about 0.1 μm to 30 μm, respectively, but are not limited thereto.

The body 100 may include two kinds or more of magnetic materials dispersed in the resin. Here, different kinds of magnetic materials mean that the magnetic materials dispersed in the resin are distinguished from each other by at least one of an average diameter, a composition, crystallinity, and a shape.

The resin may include epoxy, polyimide, liquid crystal polymer (LCP), or the like, or mixtures thereof, but is not limited thereto.

The body 100 may include a first core 110 penetrating through the support substrate 200 and the first coil portion 300 and a second core 120 penetrating through the support substrate 200 and the second coil portion 400. The cores 110 and 120 may be formed by filling through-holes of each of the first and second coil portions 300 and 400 with at least parts of the magnetic composite sheets in a process of stacking and hardening the magnetic composite sheets.

The support substrate 200 may be buried in the body 100. The support substrate 200 may be configured to support coil portions 300 and 400 to be described later.

The support substrate 200 may be formed of an insulating material including a thermosetting resin such as an epoxy resin, a thermoplastic resin such as a polyimide resin, or a photosensitive insulating resin or be formed of an insulating material having a reinforcement material such as a glass fiber or an inorganic filler impregnated in such an insulating resin. As an example, the support substrate 200 may be formed of an insulating material such as prepreg, an Ajinomoto Build-up Film (ABF), FR-4, a Bismaleimide Triazine (BT) film, or a photoimagable dielectric (PID) film, but is not limited thereto.

As the inorganic filler, one or more materials selected from the group consisting of silica ($SiO_2$), alumina ($Al_2O_3$), silicon carbide (SiC), barium sulfate ($BaSO_4$), talc, clay, mica powder particles, aluminum hydroxide ($Al(OH)_3$), magnesium hydroxide ($Mg(OH)_2$)$_f$ calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$) may be used.

When the support substrate 200 is formed of the insulating material including the reinforcing material, the support substrate 20 may provide more excellent rigidity. When the support substrate 200 is formed of an insulating material that does not include the glass fiber, the support substrate 200 may be advantageous in decreasing a thickness of the coil component. When the support substrate 200 is formed of an insulating material including the photosensitive insulating resin, the number of processes for forming the coil portions 300 and 400 may be decreased, which may be advantageous in reducing a production cost and may be advantageous in forming fine vias.

The first and second coil portions 300 and 400 may be disposed on the support substrate 200 to be spaced apart from each other to implement characteristics of the coil component 1000 according to the present exemplary embodiment. For example, the coil component 1000 according to the present exemplary embodiment may be a coupled inductor in which a coupling coefficient k between the first and second coil portions 300 and 400 exceeds 0 and is less than or equal to 1, but is not limited thereto.

Detailed configurations of the first and second coil portions 300 and 400 will be described in detail below with reference to FIG. 2.

A plurality of external electrodes 510, 520, 530, and 540 may be disposed on surfaces of the body 100. Specifically, first and second external electrodes 510 and 520 may be disposed on a first end surface of the body 100 to be spaced apart from each other, and may be connected to the first coil portion 300. Third and fourth external electrodes 530 and 540 may be disposed on a second end surface of the body 100 to be spaced apart from each other, and may be connected to the second coil portion 400.

The external electrodes 510, 520, 530, and 540 may be formed of a conductive material such as copper (Cu), aluminum (Al), silver (Ag), tin (Sn), gold (Au), nickel (Ni), lead (Pb), titanium (Ti), or alloys thereof, but are not limited thereto.

The external electrodes 510, 520, 530, and 540 may be formed in a single layer structure or a multilayer structure. As an example, the first external electrode 510 may include a first layer including copper (Cu), a second layer disposed on the first layer and including nickel (Ni), and a third layer disposed on the second layer and including tin (Sn). Here, each of the first to third layers may be formed by plating, but is not limited thereto. As another example, the first external electrode 510 may include a resin electrode layer including conductive powder particles and a resin and a plating layer formed on the resin electrode layer by plating. In this case, the resin electrode layer may include a cured product of conductive powder particles of at least one of copper (Cu) and silver (Ag) and a thermosetting resin. In addition, the plating layer may include a first plating layer including nickel (Ni) and a second plating layer including tin (Sn). When the resin included in the resin electrode layer is the same as the insulating resin of the body 100, a coupling force between the resin electrode layer and the body 100 may be improved.

FIG. 2 is a view illustrating a dispositional form of the first and second coil portions 300 and 400 on one surface of the support substrate 200 when viewed from above in FIG. 1.

FIG. 3 is a view illustrating a dispositional form of the first and second coil portions 300 and 400 on the other surface of the support substrate 200 when viewed from above in FIG. 1.

Since both of FIGS. 2 and 3 illustrate shapes viewed from above in FIG. 1, a shape of each layer of the coil portions 300 and 400 may be three-dimensionally grasped by sequentially projecting FIGS. 2 and 3.

Referring to FIGS. 2 and 3, the first coil portion 300 may have first winding patterns 311 and 321 forming at least one turn around the first core 110 and first extending patterns 312 and 322 extending from one end portions of the first winding patterns 311 and 321, respectively, so as to surround both the first and second cores 110 and 120. The second coil portion 400 may have second winding patterns 411 and 421 forming at least one turn around the second core 120 and second extending patterns 412 and 422 extending from one end portions of the second winding patterns 411 and 421, respectively, so as to surround both the first and second cores 110 and 120.

Specifically, the first coil portion 300 may include a first upper coil pattern 310 disposed on an upper surface of the support substrate 200, a first lower coil pattern 320 disposed on a lower surface of the support substrate 200, and a via penetrating through the support substrate 200 to connect the first upper coil pattern 310 and the first lower coil pattern 320 to each other, on the basis of the directions of FIG. 1.

Referring to FIG. 2, the first upper coil pattern 310 may have a first upper winding pattern 311 forming at least one turn around the first core 110, a first upper extending pattern 312 extending from one end portion of the first upper winding pattern 311 so as to surround both the first and second cores 110 and 120 and having one end portion disposed closer to the first end surface of the body 110 than the outermost turn of the first upper winding pattern 311 is, and a first upper lead pattern 313 extending from the first upper extending pattern 312 and exposed from the first end surface of the body 100.

Referring to FIG. 3, the first lower coil pattern 320 may have a first lower winding pattern 321 forming at least one turn around the first core 110, a first lower extending pattern 322 extending from one end portion of the first lower winding pattern 321 so as to surround both the first and second cores 110 and 120 and having one end portion disposed closer to the second end surface of the body 110 than the outermost turn of the first lower winding pattern 321 is, and a first lower lead pattern 323 extending from the first lower extending pattern 322 and exposed from the second end surface of the body 100.

Here, the other end portion of the first upper winding pattern 311 and the other end portion of the first lower winding pattern 321 may be in contact with and connected to a via, and the first upper lead pattern 313 and the first lower lead patterns 323 may be exposed from the first end surface and the second end surface of the body 100, respectively. Meanwhile, a second lower lead pattern 423 of a second coil portion 400 to be described later and the first upper lead pattern 313 may be exposed from the first end surface of the body 100 to be spaced apart from each other.

The first and fourth external electrodes 510 and 540 may be disposed on opposite directions on the first end surface and the second end surface of the body 100, respectively, and be connected to the first upper lead pattern 313 and the first lower lead pattern 323, respectively. In such a manner, the first coil portion 300 may function as a single coil extending from the first upper lead pattern 313 to the first lower lead pattern 323.

Meanwhile, the second coil portion 400 may include a second upper coil pattern 410 disposed on the upper surface of the support substrate 200, a second lower coil pattern 420 disposed on the lower surface of the support substrate 200, and a via penetrating through the support substrate 200 to connect the second upper coil pattern 410 and the second lower coil pattern 420 to each other, on the basis of the directions of FIG. 1.

Referring to FIG. 2, the second upper coil pattern 410 may have a second upper winding pattern 411 forming at least one turn around the second core 120, a second upper extending pattern 412 extending from one end portion of the second upper winding pattern 411 so as to surround both the first and second cores 110 and 120 and having one end portion disposed closer to the second end surface of the body 100 than the outermost turn of the second upper winding pattern 411 is, and a second upper lead pattern 413 extending from the second upper extending pattern 412 and exposed from the second end surface of the body 100.

Referring to FIG. 3, the second lower coil pattern 420 may have a second lower winding pattern 421 forming at least one turn around the second core 120, a second lower extending pattern 422 extending from one end portion of the second lower winding pattern 421 so as to surround both the first and second cores 110 and 120 and having one end portion disposed closer to the first end surface of the body 100 than the outermost turn of the second lower winding pattern 422 is, and a second lower lead pattern 423 extending from the second lower extending pattern 422 and exposed from the first end surface of the body 100.

Here, the other end portion of the second upper winding pattern 411 and the other end portion of the second lower winding pattern 421 may be in contact with and connected to a via, and the second upper lead pattern 413 and the second lower lead patterns 423 may be exposed from the second end surface and the first end surface of the body 100, respectively. Meanwhile, the first lower lead pattern 323 of the first coil portion 300 and the second upper lead pattern 413 may be exposed from the second end surface of the body 100 to be spaced apart from each other.

The third and second external electrodes 530 and 520 may be disposed on opposite directions on the second end surface and the first end surface of the body 100, respectively, and be connected to the second upper lead pattern 413 and the second lower lead pattern 423, respectively. In such a manner, the second coil portion 400 may function as a single coil extending from the second upper lead pattern 413 to the second lower lead pattern 423.

In this case, a width d1 (see FIG. 4) of each of the lead patterns 313, 323, 413, and 423 exposed from the surfaces of the body 100 may be greater than a width d5 of each of the coil patterns 310, 320, 410, and 420, and be greater than a width d3 (see FIG. 4) of each of the external electrodes 510, 520, 530, and 540.

By forming the lead patterns 313, 323, 413, and 423 at the great width d1 as described above, spaces between the external electrodes 510, 520, 530, and 540 and the lead patterns 313, 323, 413, and 423 may not be hidden by the insulating layer 600 even when an alignment defect or a bleeding phenomenon of the insulating layer 600 at the time of insulation printing occurs, and a direct current resistance (Rdc) of the coil component may resultantly be improved. In addition, lead heat resistance may be improved, such that high reliability may be secured.

However, in the present exemplary embodiment, the first upper lead pattern 313 and the second lower lead pattern 423 of the first end surface of the body 100 may be spaced apart from each other in relation to a center line C and the second upper lead pattern 413 and the first lower lead pattern 323 of the second end surface of the body 100 may be spaced apart from each other in relation to the center line C, such that the lead patterns 313, 323, 413, and 423 may not overlap each other.

This will be described in more detail with reference to FIG. 4.

FIG. 4 is a view illustrating a disposition of the lead patterns 313 and 423 on the first end surface of the body 100 when viewed in the length direction.

Referring to FIG. 4, the first upper lead pattern 313 disposed on the upper surface of the support substrate 200 and the second lower lead pattern 423 disposed on the lower surface of the support substrate 200 may be exposed from the first end surface of the body 100, and portions on the exposed patterns may be covered with the insulating layer 600.

Here, the insulating layer 600 may be disposed on the first end surface of the body 100. A first opening 610 for connecting the first upper lead pattern 313 and the first external electrode 510 to each other and a second opening 620 for connecting the second lower lead pattern 423 and the second external electrode 520 to each other may be formed in the insulating layer 600.

Meanwhile, the first opening 610 and the second opening 620, which are portions that are not covered with the insulating layer 600, may have the same width d3 as that of the external electrodes 510 and 520, and the external electrodes 510 and 520 may be coupled to the first and second openings 610 and 620, respectively.

The insulating layer 600 may be formed by stacking an insulating film including an insulating resin on the first end surface of the body 100 or applying and hardening an insulating paste including an insulating resin and an insulating filer onto the first end surface of the body 100. The insulating resin may be a thermosetting resin such as an epoxy resin, but is not limited thereto. The insulating filer may be an inorganic filler such as silica ($SiO_2$) or be an organic filler such as epoxy beads, but is not limited thereto.

Each of the first and second openings 610 and 620 may be formed by forming the insulating layer 600 over the entirety of the first end surface of the body 100 and then selectively removing a part of the insulating layer 600 or be formed by selectively forming the insulating layer 600 on the first end surface of the body 100. When the first and second openings 610 and 620 are formed by selectively removing the insulating layer 600, the insulating layer 600 includes a photosensitive resin, and the first and second openings 610 and 620 may thus be formed by a photolithography process including an exposure process or the like, and are not limited thereto. When the first and second openings 610 and 620 are formed by selectively forming the insulating layer 600, the insulating layer 600 may be formed by a printing process, but is not limited thereto.

The width d1 of the lead patterns 313 and 423 may be greater than the width d3 of the external electrodes 510 and 520, and may thus be greater than the width d3 of the openings 610 and 620. However, a width d2 of each of regions exposed onto the first opening 610 and the second opening 620 in entire exposed surfaces of the first upper lead pattern 313 and the second lower lead pattern 423 may be smaller than the width d3 of each of the first opening 610 and the second opening 620. Therefore, even in a case where insulating bleeding occurs in an insulating printing process, exposed surfaces d2 on which the external electrodes 510 and 520 are coupled to the lead patterns 313 and 423, respectively, may be sufficiently secured.

In addition, the first upper lead pattern 313 and the second lower lead pattern 423 may be simultaneously covered by the insulating layer 600 of one region. Therefore, even when an alignment defect occurs in the insulating printing process, the width d2 of portions where the lead patterns 313 and 423 coupled to the external electrodes 510 and 520 are exposed to both sides of the insulating layer 600 may be secured, and a defect that the lead patterns 313 and 423 are hidden may thus be prevented.

In particular, in a case of a coupled inductor having a small chip size, parts of the lead patterns 313 and 423 are hidden by the insulating layer 600 in the insulation printing process, such that a possibility of occurrence of a defect that a direct current resistance (Rdc) component becomes large increases. Therefore, an improved effect may be obtained by the present disclosure.

The description for FIGS. 1 through 4 provided above corresponds to one exemplary embodiment, and a modified exemplary embodiment will hereinafter be described with reference to FIGS. 5 through 8.

Figure 5:
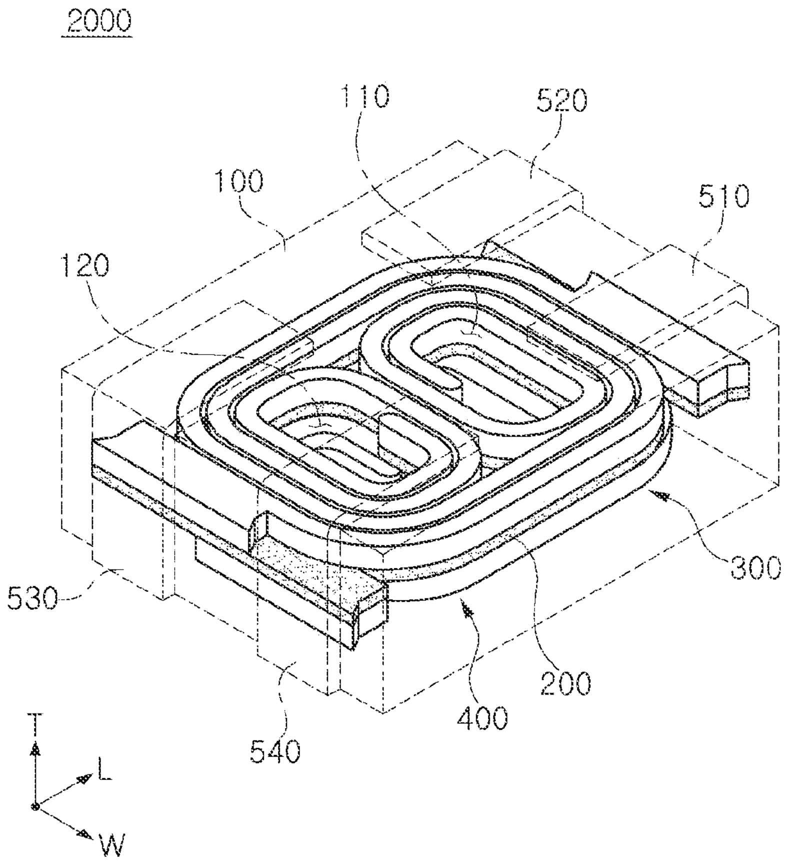
FIG. 5 is a schematic view illustrating a coil component according to another exemplary embodiment in the present disclosure.

FIG. 5 is a schematic view illustrating a coil component 2000 in which parts of lead patterns 313 and 423 spaced apart from each other overlap each other according to another exemplary embodiment in the present disclosure.

Referring to FIG. 5, the coil component 2000 according to another exemplary embodiment in the present disclosure may include a body 100, a support substrate 200, a first coil portion 300, a second coil portion 400, and external electrodes 510, 520, 530, and 540, and may further include an insulating layer 600 (see FIG. 8) surrounding the body 100.

Configurations and functions of respective portions, coupling relationships between the respective portions, materials of the respective portions, forming methods of the respective portions, and the like, may be the same as those of the coil component 100 of FIG. 1.

The coil component 2000 according to another exemplary embodiment may be different from the coil component 1000 of FIG. 1 in that a width of the lead patterns 313 and 423 exposed from the first end surface of the body 100 in the length direction and disposed on and beneath of the support substrate 200, respectively, is made greater than that of the first coil component 1000 of FIG. 1, such that at least parts of each of the lead patterns 313 and 423 may overlap each other when projected in a direction perpendicular to one surface of the support substrate 200.

Figure 6:
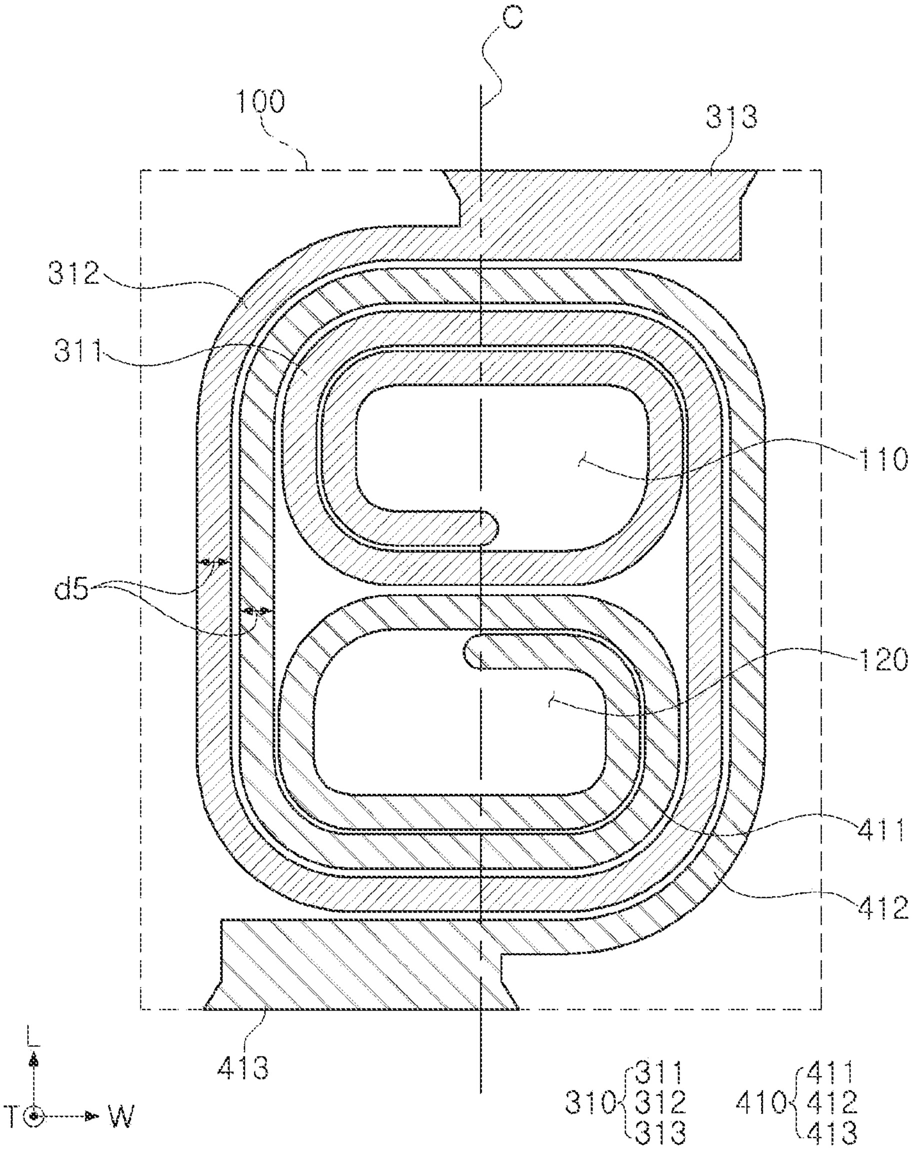
FIG. 6 is a view illustrating a dispositional form of first and second coil portions on one surface of a support substrate in a case where parts of lead patterns spaced apart from each other overlap each other, when viewed from above in FIG. 5.

FIG. 6 is a view illustrating a dispositional form of the first and second coil portions 300 and 400 on one surface of the support substrate 200 in a case where parts of the lead patterns 313 and 423 spaced apart from each other overlap each other, when viewed from above in FIG. 5.

Figure 7:
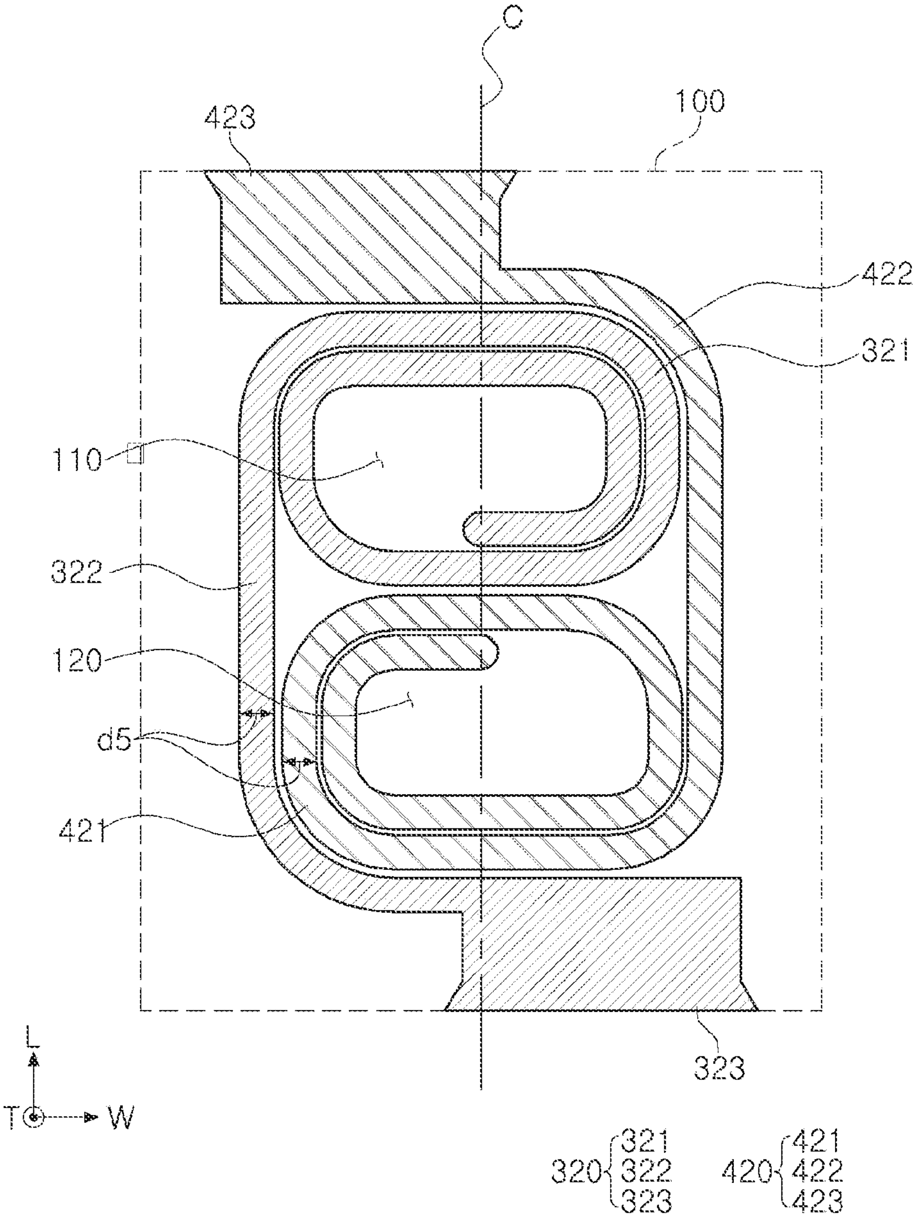
FIG. 7 is a view illustrating a dispositional form of the first and second coil portions on the other surface of the support substrate in a case where parts of the lead patterns spaced apart from each other overlap each other, when viewed from above in FIG. 5.

FIG. 7 is a view illustrating a dispositional form of the first and second coil portions 300 and 400 on the other surface of the support substrate 200 in a case where parts of the lead patterns 313 and 423 spaced apart from each other overlap each other, when viewed from above in FIG. 5.

Since both of FIGS. 6 and 7 illustrate shapes viewed from above in FIG. 5, a shape of each layer of the coil portions 300 and 400 may be three-dimensionally grasped by sequentially projecting FIGS. 6 and 7.

Referring to FIGS. 6 and 7, a width d1 of the lead patterns 313, 323, 413, and 423 that may be exposed from the first end surface or the second end surface of the body 100 to be connected to the external 510, 520, 530, and 540 may be greater than that of the case of FIGS. 2 and 3.

More specifically, a width of the first upper lead pattern 313 of FIG. 6 may be extended to a part of a left region of a centerline C, and a width of the second upper lead pattern 413 may be extended to a part of a right region of the center line C.

In addition, a width of the first lower lead pattern 323 of FIG. 7 may be extended to a part of a left region of the center line C, and a width of the second lower lead pattern 423 may be extended to a part of a right region of the center line C.

As a result, when projected in the direction perpendicular to one surface of the support substrate 200, at least parts of each of the first upper lead pattern 313 and the second lower lead pattern 423 may overlap each other in both directions in relation to the center line C, and at least parts of each of the second upper lead pattern 413 and the first lower lead pattern 323 may also overlap each other in both directions in relation to the center line C.

Figure 8:
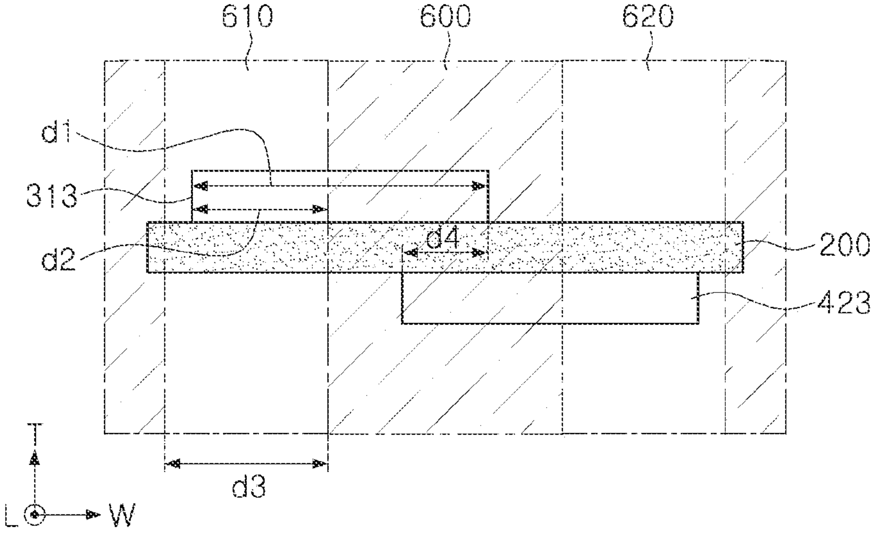
FIG. 8 is a view illustrating a disposition of the lead patterns on a first end surface of the body when viewed in the length direction in a case where parts of the lead patterns spaced apart from each other overlap each other.

FIG. 8 is a view illustrating a disposition of the lead patterns 313 and 423 on the first end surface of the body 100 when viewed in the length direction in a case where parts of the lead patterns 313 and 423 spaced apart from each other overlap each other.

Referring to FIG. 8, the first upper lead pattern 313 disposed on the upper surface of the support substrate 200 and the second lower lead pattern 423 disposed on the lower surface of the support substrate 200 may be exposed from the first end surface of the body 100, and portions on the exposed patterns may be covered with the insulating layer 600.

In this case, the width d1 of the lead patterns 313 and 423 may be greater than that of FIGS. 2 and 3. Therefore, a region in which at least parts of each of the first upper lead pattern 313 and the second lower lead pattern 423 overlap each other (for example, a region having a width of d4) when projected in the direction perpendicular to one surface of the support substrate 200 may be formed.

Here, a first opening 610 for connecting the first upper lead pattern 313 and the first external electrode 510 to each other and a second opening 620 for connecting the second lower lead pattern 423 and the second external electrode 520 to each other may be formed in the insulating layer 600.

Meanwhile, the first opening 610 and the second opening 620, which are portions that are not covered with the insulating layer 600, may have the same width d3 as that of the external electrodes 510 and 520, and the external electrodes 510 and 520 may be coupled to the first and second openings 610 and 620, respectively.

The width d1 of the lead patterns 313 and 423 may be greater than the width d3 of the external electrodes 510 and 520, and may thus be greater than the width d3 of the openings 610 and 620. However, a width d2 of each of regions exposed onto the first opening 610 and the second opening 620 in entire exposed surfaces of the first upper lead pattern 313 and the second lower lead pattern 423 may be smaller than the width d3 of each of the first opening 610 and the second opening 620. Therefore, even in a case where insulating bleeding occurs in an insulating printing process, exposed surfaces d2 on which the external electrodes 510 and 520 are coupled to the lead patterns 313 and 423, respectively, may be sufficiently secured.

In addition, the first upper lead pattern 313 and the second lower lead pattern 423 may be simultaneously covered by the insulating layer 600 of one region. Therefore, even when an alignment defect occurs in the insulating printing process, the width d2 of portions where the lead patterns 313 and 423 coupled to the external electrodes 510 and 520 are exposed to both sides of the insulating layer 600 may be secured, and a defect that the lead patterns 313 and 423 are hidden may thus be prevented.

In particular, in a case of a coupled inductor having a small chip size, parts of the lead patterns 313 and 423 are hidden by the insulating layer 600 in the insulation printing process, such that a possibility of occurrence of a defect that a direct current resistance (Rdc) component becomes large increases. Therefore, an improved effect may be obtained by the present disclosure.

Functions, structures, materials, and forming methods of the coil portions 300 and 400 will hereinafter be described in detail.

Referring to FIGS. 1 through 3, the second extending patterns 412 and 422 of the second coil portion 400 may be disposed between the outermost turns of the first winding patterns 311 and 321 and the first extending patterns 312 and 322, respectively, on the first end surface side of the body 100 in relation to the center of the body 100 in the length direction L. Similarly, the first extending patterns 312 and 322 of the first coil portion 300 may be disposed between the outermost turns of the second winding patterns 411 and 421 and the second extending patterns 412 and 422, respectively, on the second end surface side of the body 100. That is, the first and second coil portions 300 and 400 may be disposed in a structure in which the respective turns are alternately disposed. Therefore, the first and second coil portions 300 and 400 may easily be electromagnetically coupled to each other.

Each of the first and second coil portions 300 and 400 may include a first conductive layer in contact with the support substrate 200 and a second conductive layer disposed on the first conductive layer and exposing side surfaces of the first conductive layer. Specifically, the first upper coil pattern 310 and the first lower coil pattern 320 of the first coil portion 300 may include, respectively, first conductive layers in contact with the upper and lower surfaces of the support substrate 200, respectively, and second conductive layers disposed on the first conductive layers and exposing side surfaces of the first conductive layers. The second upper coil pattern 410 and the second lower coil pattern 420 of the second coil portion 400 may include, respectively, first conductive layers in contact with the upper and lower surfaces of the support substrate 200, respectively, and second conductive layers disposed on the first conductive layers and exposing side surfaces of the first conductive layers. The first conductive layer may be a seed layer for forming the second conductive layer on the support substrate 200 by plating.

The first and second coil portions 300 and 400 may be formed by forming seed films for forming the first conductive layers on both surfaces of the support substrate 200, plating resists for forming the first and second coil portions 300 and 400 on the seed films, forming the second conductive layers in openings of the plating resists for forming the first and second coil portions 300 and 400 by plating, removing the plating resists for forming the first and second coil portions 300 and 400, and then removing the seed films exposed outwardly. As a result of the above process, the second conductive layer may have a form in which it does not cover the side surfaces of the first conductive layer.

Each of the first and second coil portions 300 and 400 may include a first conductive layer in contact with the support substrate 200 and a second conductive layer disposed on the first conductive layer and covering side surfaces of the first conductive layer to be in contact with the support substrate 200. Specifically, the first upper coil pattern 310 and the first lower coil pattern 320 of the first coil portion 300 may include, respectively, first conductive layers in contact with the upper and lower surfaces of the support substrate 200, respectively, and second conductive layers disposed on the first conductive layers and covering side surfaces of the first conductive layers to be in contact with the support substrate 200. The second upper coil pattern 410 and the second lower coil pattern 420 of the second coil portion 400 may include, respectively, first conductive layers in contact with the upper and lower surfaces of the support substrate 200, respectively, and second conductive layers disposed on the first conductive layers and covering side surfaces of the first conductive layers to be in contact with the support substrate 200. The first conductive layer may be a seed layer for forming the second conductive layer on the support substrate 200 by plating.

The first and second coil portions 300 and 400 may be formed by forming the first conductive layers corresponding to shapes of the coil patterns 310, 320, 410, and 420 on both surfaces of the support substrate 200, forming plating resists in spaces between turns of the first conductive layers, forming the second conductive layers in openings of the plating resists by plating, and then removing the plating resists. Meanwhile, a description has been provided on the assumption that the plating resist is used at the time of forming the second conductive layer in the example described above, but the second conductive layer may also be formed without using the plating resist in a case of using a plating method.

Since the first conductive layer is a seed layer for forming the second conductive layer by electroplating, the first conductive layer may be formed to be relatively thinner than the second conductive layer. The first conductive layer may be formed by a thin film process such as sputtering or an electroless plating process. When the first conductive layer is formed by the thin film process such as the sputtering, at least some of materials constituting the first conductive layer may permeate into the surface of the support substrate 200. This may be confirmed through the fact that a difference occurs in a concentration of metal materials constituting the first conductive layer in the support substrate 200 along the thickness direction T of the body 100.

A thickness of the first conductive layer may be 1.5 μm or more and 3 μm or less. When the thickness of the first conductive layer is less than 1.5 μm, it may be difficult to implement the first conductive layer, such that a plating defect may occur in a subsequent process. When the thickness of the first conductive layer is more than 3 μm, it may be difficult to forma relatively large volume of the second conductive layer within a limited volume of the body 100.

The via may include one or more conductive layers. As an example, when the via is formed by electroplating, the via may include a seed layer formed on an inner wall of a via hole penetrating through the support substrate 200 and an electroplating layer filling the via hole in which the seed layer is formed. The seed layer of the via may be formed together with the first conductive layer in the same process as a process of forming the first conductive layer to be formed integrally with the first conductive layer or may be formed in a process different from a process of forming the first conductive layer, such that a boundary between the seed layer of the via and the first conductive layer may be formed. The electroplating layer of the via may be formed together with the second conductive layer in the same process as a process of forming the second conductive layer to be formed integrally with the second conductive layer or may be formed in a process different from a process of forming the second conductive layer, such that a boundary between the electroplating layer of the via and the second conductive layer may be formed.

When a line width of the coil patterns 310, 320, 410, and 420 is excessively large, a volume of the magnetic material in the same volume of the body 100 may be reduced, which may have a negative influence on an inductance. As a non-restrictive example, a ratio of a thickness to a width, that is, an aspect ratio (AR), of each turn of the coil patterns 310, 320, 410, and 420 based on a cross-section in the width direction W-thickness direction T may be 3:1 to 9:1.

Each of the coil patterns 310, 320, 410, and 420 and the vias may be formed of a conductive material such as copper (Cu), aluminum (Al), silver (Ag), tin (Sn), gold (Au), nickel (Ni), lead (Pb), titanium (Ti), chromium (Cr), or alloys thereof, but are not limited thereto. As a non-restrictive example, when the first conductive layer is formed by the sputtering and the second conductive layer is formed by the electroplating, the first conductive layer may include at least one of molybdenum (Mo), chromium (Cr), copper (Cu), and titanium (Ti), and the second conductive layer may include copper (Cu). As another non-restrictive example, when the first conductive layer is formed by the electroless plating and the second conductive layer is formed by the electroplating, each of the first conductive layer and the second conductive layer may include copper (Cu). In this case, a density of copper (Cu) in the first conductive layer may be lower than that of copper (Cu) in the second conductive layer.

As set forth above, according to the present disclosure, in an array-type coil component, a defect occurring due to an insulating layer obscuring two electrodes disposed on one surface of the coil component may be reduced.

While exemplary embodiments have been shown and described above, it will be apparent to those skilled in the art that modifications and variations could be made without departing from the scope of the present invention as defined by the appended claims.

What is claimed is:

1. A coil component comprising:

a support substrate;

first and second coil portions disposed on the support substrate to be spaced apart from each other;

a body surrounding the support substrate and the first and second coil portions; and a plurality of external electrodes disposed on a surface of the body, wherein each of the first and second coil portions includes a coil pattern and a lead pattern connected to the coil pattern and exposed from the surface of the body, a width of an exposed portion of each lead pattern exposed from the surface of the body is greater than a width of corresponding coil pattern and the plurality of external electrodes, and width of each lead pattern increases gradually from a first end of that lead pattern adjacent the corresponding coil pattern to the exposed portion of that lead pattern, and a portion of the lead pattern of the first coil portion overlaps with a portion of the lead pattern of the second coil portion when projected in a direction perpendicular to a surface of the support substrate.

2. The coil component of claim 1, wherein each of the plurality of external electrodes is connected to corresponding lead pattern on the surface of the body.

3. The coil component of claim 1, wherein the plurality of external electrodes include:

first and second external electrodes disposed on a first end surface of the body to be spaced apart from each other; and third and fourth external electrodes disposed on a second end surface of the body to be spaced apart from each other, the second end surface of the body opposing the first end surface of the body, the lead pattern of the first coil portion includes a first upper lead pattern and a first lower lead pattern exposed from the first end surface and the second end surface of the body, respectively, and connected to the first and fourth external electrodes, respectively, and the lead pattern of the second coil portion includes a second upper lead pattern and a second lower lead pattern exposed from the second end surface and the first end surface of the body, respectively, and connected to the third and second external electrodes, respectively.

4. The coil component of claim 3, further comprising an insulating layer disposed on the first end surface of the body and covering at least a part of each of the first upper lead pattern and the second lower lead pattern.

5. The coil component of claim 4, wherein the insulating layer has first and second openings in which the first and second external electrodes are disposed, respectively, and a width of each of the first and second openings is greater than a width of a region, exposed to the first opening or the second opening, of each exposed portion of the first upper lead pattern and the second lower lead pattern, exposed from the first end surface of the body.

6. A coil component comprising:

a support substrate;

first and second coil portions disposed on at least one surface of the support substrate to be spaced apart from each other;

a body surrounding the support substrate and the first and second coil portions; and first, second, third and fourth external electrodes disposed on the body to be spaced apart from each other, wherein the first coil portion includes a first coil pattern and a first upper lead pattern and a first lower lead pattern connected to the first coil pattern and exposed from the body, the second coil portion includes a second coil pattern and a second upper lead pattern and a second lower lead pattern connected to the second coil pattern and exposed from the body, at least portions of each of the first upper lead pattern and the second lower lead pattern overlap each other when projected in a direction perpendicular to the at least one surface of the support substrate, and at least portions of each of the second upper lead pattern and the first lower lead pattern overlap each other when projected in the direction perpendicular to the at least one surface of the support substrate.

7. The coil component of claim 6, wherein a width of each exposed portion of the first upper and lower lead patterns and the second upper and lower lead patterns exposed from surfaces of the body is greater than a width of each of the first and second coil patterns and the first to fourth external electrodes.

8. The coil component of claim 6, further comprising an insulating layer disposed on a first end surface of the body and covering at least a part of each of the first upper lead pattern and the second lower lead pattern, wherein the insulating layer has first and second openings in which the first and second external electrodes are disposed, respectively, and a width of each of the first and second openings is greater than a width of a region, exposed to the first opening or the second opening, of each exposed portion of the first upper lead pattern and the second lower lead pattern, exposed from the first end surface of the body.

9. A coil component comprising:

a support substrate;

first and second coil portions disposed on one surface of the support substrate to be spaced apart from each other;

a body surrounding the support substrate and the first and second coil portions; and first and second external electrodes disposed on a first end surface of the body, spaced apart from each other, and connected to the first and second coil portions, respectively, wherein each of the first and second coil portions includes a coil pattern and a lead pattern connected to the coil pattern and exposed from the first end surface of the body, a width of an exposed portion of each lead pattern exposed from the first end surface of the body is greater than a width of an inner portion of that lead pattern connected to corresponding coil pattern, and each exposed portion of the first and second coil portions at least partially overlaps a space between the first and second external electrodes, in a direction perpendicular to the first end surface.

10. The coil component of claim 9, wherein the width of the exposed portion of each lead pattern is greater than a width of each of the coil pattern and the first and second external electrodes.

11. The coil component of claim 9, wherein the exposed portion of the lead pattern of the first coil portion and the exposed portion of the lead pattern of the second coil portion at least partially overlap each other, when projected in a direction perpendicular to the one surface of the support substrate.

12. The coil component of claim 9, wherein the exposed portion of the lead pattern of the first coil portion is spaced apart from the exposed portion of the lead pattern of the second coil portion, in a direction in which the first and second external electrodes are spaced apart from each other.

13. The coil component of claim 9, further comprising third and fourth external electrodes disposed on a second end surface of the body to be spaced apart from each other, the second end surface of the body opposing the first end surface of the body, wherein the lead pattern of the first coil portion includes a first upper lead pattern and a first lower lead pattern exposed from the first end surface and the second end surface of the body, respectively, and connected to the first and fourth external electrodes, respectively, and the lead pattern of the second coil portion includes a second upper lead pattern and a second lower lead pattern exposed from the second end surface and the first end surface of the body, respectively, and connected to the third and second external electrodes, respectively.

14. The coil component of claim 9, further comprising an insulating layer disposed on the first end surface of the body and covering at least a part of each exposed portion of the lead patterns of the first and second coil portions.

15. The coil component of claim 14, wherein the insulating layer has first and second openings in which the first and second external electrodes are disposed, respectively, and a width of each of the first and second openings is greater than a width of a region, exposed to the first opening or the second opening, of each exposed portion of the lead patterns of the first and second coil portions.

16. The coil component of claim 9, wherein the body includes a first core penetrating through the support substrate and the first coil portion and a second core penetrating through the support substrate and the second coil portion.

17. The coil component of claim 16, wherein the coil pattern of the first coil portion comprises a first winding pattern including at least one turn around the first core, and a first extending pattern extending from one end portion of the first winding pattern and surrounding both of the first and second cores, and the coil pattern of the second coil portion comprises a second winding pattern including at least one turn around the second core, and a second extending pattern extending from one end portion of the second winding pattern and surrounding both of the first and second cores.

* * * * *